(12) United States Patent
Youngs et al.

(10) Patent No.: US 7,371,341 B2
(45) Date of Patent: May 13, 2008

(54) METHOD OF FORMING A VEHICLE COMPONENT

(75) Inventors: John D. Youngs, Southgate, MI (US); Glenn A. Cowelchuk, Chesterfield, MI (US); Michael P Schoemann, Waterford, MI (US); Randy S. Reed, Fair Haven, MI (US)

(73) Assignee: International Automotive Components Group North America, Inc., Dearborn, MI (US)

( * ) Notice: Subject to any disclaimer, the term of this patent is extended or adjusted under 35 U.S.C. 154(b) by 803 days.

(21) Appl. No.: 10/842,602

(22) Filed: May 10, 2004

(65) Prior Publication Data

US 2005/0248055 A1 Nov. 10, 2005

(51) Int. Cl.
*B29C 45/16* (2006.01)

(52) U.S. Cl. .................. 264/238; 264/242; 264/250; 264/255

(58) Field of Classification Search .................. None
See application file for complete search history.

(56) References Cited

U.S. PATENT DOCUMENTS

| | | | |
|---|---|---|---|
| 3,088,771 A * | 5/1963 | Weigle | ............... 296/37.5 |
| 5,072,983 A | 12/1991 | Muroi et al. | |
| 5,261,716 A | 11/1993 | Phelps | |
| 5,535,571 A | 7/1996 | Nichols | |
| 5,795,005 A | 8/1998 | Garfias et al. | |
| 5,899,522 A | 5/1999 | DeRees et al. | |
| 5,975,563 A * | 11/1999 | Gallagher et al. | ....... 280/728.3 |
| 6,089,642 A * | 7/2000 | Davis et al. | ............... 296/70 |
| 6,116,672 A | 9/2000 | Cannon et al. | |
| 6,120,077 A | 9/2000 | Westphal et al. | |
| 6,471,276 B1 | 10/2002 | Brunsman et al. | |
| 7,244,383 B2 * | 7/2007 | Youngs et al. | ............... 264/255 |

* cited by examiner

*Primary Examiner*—Edmund H. Lee
(74) *Attorney, Agent, or Firm*—MacMillan, Sobanski & Todd, LLC

(57) ABSTRACT

A method of manufacturing a vehicle trim panel having a storage compartment includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate. A second material is introduced into the second cavity, such that the second material forms a movable wall. The substrate and the movable wall define a vehicle trim panel, wherein the movable wall includes a fold formed therein for permitting movement of the movable wall to expand the storage compartment.

7 Claims, 4 Drawing Sheets

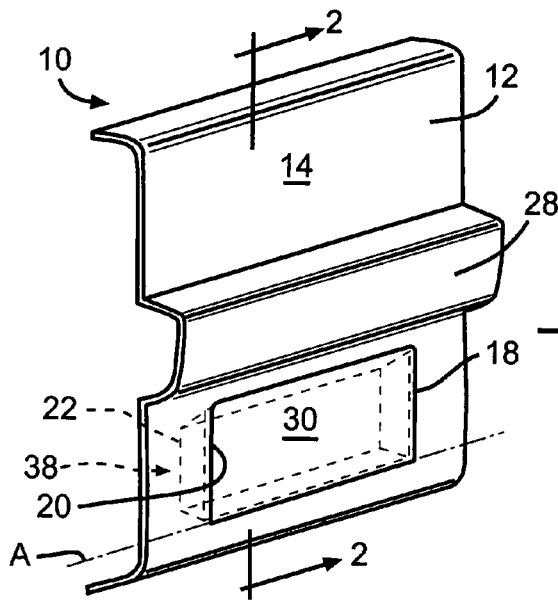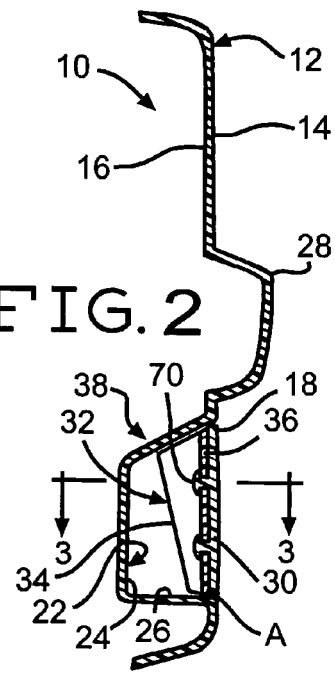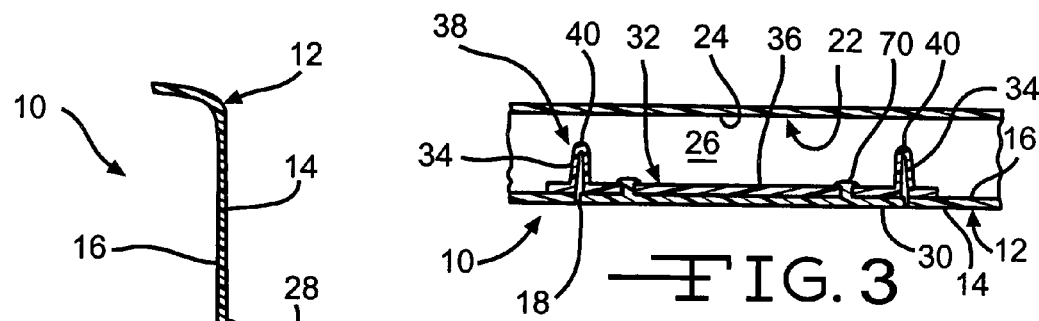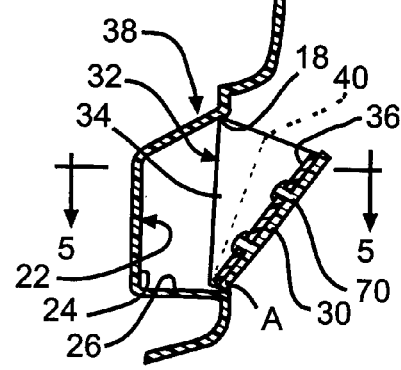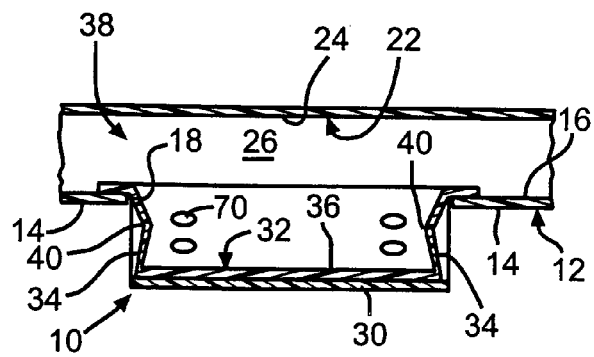

METHOD OF FORMING A VEHICLE COMPONENT

TECHNICAL FIELD

This invention relates to interior vehicle components. More particularly, the invention relates to a method of manufacturing a pocket for holding an article in an interior vehicle trim panel.

BACKGROUND OF THE INVENTION

It is known to provide an interior trim panel for a vehicle, and components thereof, which is aesthetically and/or tactilely pleasing to the vehicle occupants. Such trim panels may include a cavity, such as a map pocket, covered by an articulating cover, or door. However, known articulating doors are typically complex and require many components and complex and expensive methods of manufacturing. It would therefore be desirable to provide an improved method of manufacturing an articulating door for a cavity formed in an interior vehicle trim panel.

SUMMARY OF THE INVENTION

This invention relates to an improved method of manufacturing a vehicle trim panel having a storage compartment. The method includes providing a first mold assembly comprising a first mold section and a second mold section, wherein the first mold assembly defines a first cavity. A second mold assembly is provided and comprises a third mold section and a fourth mold section. The second mold assembly defines a second cavity. A first material is introduced into the first cavity, thereby producing a substrate. A second material is introduced into the second cavity, such that the second material forms a movable wall. The substrate and the movable wall define a vehicle trim panel, wherein the movable wall includes a fold formed therein for permitting movement of the movable wall to expand the storage compartment.

Various objects and advantages of this invention will become apparent to those skilled in the art from the following detailed description of the preferred embodiment, when read in light of the accompanying drawings.

BRIEF DESCRIPTION OF THE DRAWINGS

FIG. 1 is a perspective view of a vehicle trim panel manufactured in accordance with the method of the invention.

FIG. 2 is a cross sectional view of the vehicle trim panel taken along line 2-2 of FIG. 1.

FIG. 3 is a partial cross sectional view of the vehicle trim panel taken along line 3-3 of FIG. 2.

FIG. 4 is a cross sectional view of the vehicle trim panel illustrated in FIG. 2, showing the compartment closure in the open position.

FIG. 5 is a partial cross sectional view of the vehicle trim panel taken along line 5-5 of FIG. 4.

DETAILED DESCRIPTION OF THE INVENTION

Figure 6:
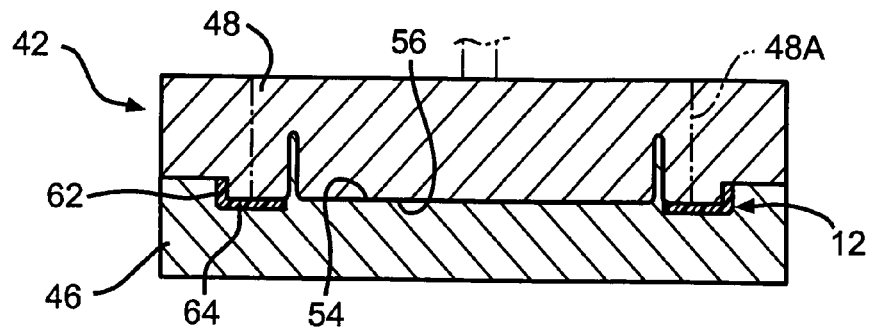
FIG. 6 is a schematic cross sectional view showing the substrate illustrated in FIG. 1 in a first mold assembly used in accordance with the method of the invention.

Referring now to the drawings, there is illustrated in FIGS. 1 through 5, inclusive, a vehicle trim panel, generally shown at 10. In the exemplary embodiment illustrated, the trim panel 10 is an automotive door trim panel 10 which mounts to a vehicle door assembly (not shown). It will be appreciated however, that the trim panel 10 of the subject invention may be any desired vehicle trim panel, such as a center console, an instrument panel, and the like.

The door panel 10 includes a substrate 12. The substrate 12 includes an A-side surface 14 which faces the vehicle occupant, and a B-side surface 16 which faces away from the vehicle occupant. The substrate 12 includes an inner edge 18 which defines an opening 20. Preferably, the opening 20 defines a recess 22, and includes a rear wall 24 and a support surface 26. In the exemplary embodiment illustrated, the substrate 12 includes an armrest 28, although an armrest is not required.

Preferably, a compartment closure 30 is movable mounted to the substrate 12 and is movable between a first or closed position, as shown in FIGS. 2 and 3, and a second or open position, as shown in FIGS. 4 and 5. More preferably, the closure 30 is pivotally mounted to the substrate 12 about a pivot axis A.

As best shown in FIGS. 2 through 5, inclusive, a movable wall 32 is extends between the substrate 12 and the closure 30. Preferably, the movable wall 32 includes a pair of opposing side wall members 34 and a closure portion 36 therebetween. The rear wall 24, support surface 26, closure 30, and movable wall 32 define a storage compartment 38. Preferably, each of the side wall members 34 includes a fold 40 formed therein for permitting movement of the movable wall 32 to expand the storage compartment 38, such as when the compartment closure 30 is moved from the closed position to the open position. As best shown in FIGS. 3 and 5, the side wall members 34 of the movable wall 32 are attached to the B-side surface 16 within the opening 20. Preferably, the side wall members are integrally molded to the B-side surface 16 according to the method of the invention, as will be described herein below.

As best shown in FIG. 1, the opening 20 is substantially rectangular-shaped. It will be understood however, that the opening 20 can have any desired shape, such as for example, a substantially oval shape.

Figure 7:
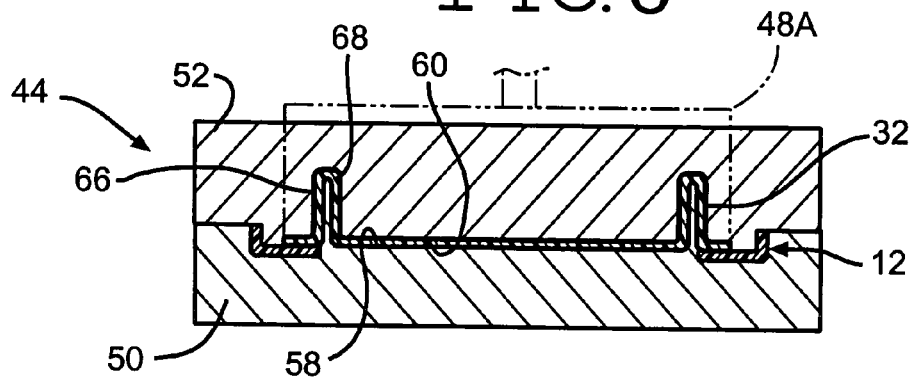
FIG. 7 is a schematic cross sectional view showing the movable wall and the substrate illustrated in FIGS. 2 through 4 in a second mold assembly used in accordance with the method of the invention.

Referring now to FIGS. 6 and 7, there is illustrated a first mold assembly 42, and a second mold assembly 44, respectively, which are adapted to be used in accordance with the method of this invention. Preferably, the first mold assembly 42 includes a first mold section 46 and a second mold section 48, as shown in FIG. 6. The second mold assembly 44 includes a third mold section 50 and a fourth mold section 52, as shown in FIG. 7. Preferably, the first mold section 46 functions as the third mold section 50, as will be described herein below. The first mold section 46 includes a first mold surface 54, the second mold section 48 includes a second mold surface 56, the third mold section 50 includes a third mold surface 58, and the fourth mold section 52 includes a fourth mold surface 60.

Although illustrated schematically in FIGS. 6 and 7, it will be appreciated that the mold surfaces 54, 56, 58, and 60 may be of any desired shape and contour. The mold sections 46, 48, 50, and 52 are preferably mounted to platens (not shown) of a press (not shown), such as a vertical molding press with sufficient tonnage to accomplish the method herein described.

It will be appreciated, that in accordance with each embodiment of the invention as will be described below, a first step of the method of the invention includes providing a suitable mold assembly or assemblies, such as the first and second mold assemblies 42 and 44, respectively illustrated in FIGS. 6 and 7.

A first embodiment of the method of the invention is illustrated generally in FIGS. 6 and 7. A second step of the first embodiment of the method is illustrated generally in FIG. 6. In the second step, the first mold assembly 42 is moved to a first closed position, as viewed in FIG. 6. In the first closed position, the first mold section 46 and the second mold section 48 define a first cavity 62. A first material 64 is then introduced into the first cavity 62. Any desired material can be introduced into the first cavity 62. Preferably the first material 64 is molten plastic, such as polypropylene or glass-filled polypropylene. It will be understood that any other desired thermoplastic can be used. The first material 64 then conforms to the shape of the first cavity 62, thereby forming the substrate 12. The first mold section 46 and the second mold section 48 are then moved away from one another.

A third step of the method of this invention is illustrated generally in FIG. 7. In the third step, the third mold section 50 and the fourth mold section 52 are moved into contact with one another and into a second closed position, thereby enclosing the substrate 12 and defining the second mold assembly 44. Preferably however, the substrate 12 remains in the first mold section 46 and the first mold section 46 and the fourth mold section 52 are moved into contact with one another and into the second closed position, thereby defining the second mold assembly 44.

In the second closed position, the third mold section 50 and the fourth mold section 52 define a second cavity 66. A second material 68 is then introduced into the second cavity 66. Any desired material can be introduced into the second cavity. Preferably, the second material 68 is molten plastic. More preferably, the second material 68 is a flexible material, such as a thermoplastic elastomer (TPE), thermoplastic elastomer-ether-ester (TEEE), or ethylene propylene diene monomer (EPDM). It will be understood that any other desired materials, such as other elastomers and non-elastomers, can be used. The second material 68 then conforms to the shape of the second cavity 66, thereby forming the movable wall 32.

The movable wall 32 is preferably formed of a flexible TPE so as to expand the storage compartment 38 when the closure 30 is in the open position as shown in FIGS. 4 and 5. As used herein, expand or expandable is defined as extending or unfolding the side wall members 34 at the folds 40, (to the right as shown in FIG. 4, and downwardly as shown in FIG. 5), such that the volume of the storage compartment 38 is increased.

Preferably, the side wall members 34 of the movable wall 32 become chemically bonded to the B-side surface 16 within the opening 20 of the substrate 12 during the molding process to form the door panel 10. However, such chemical bonding is not required. For example, features, such as recesses and protrusions, can be provided on a mold surface, such as the second mold surface 56 of the second mold section 48 to form corresponding recesses and protrusions in a surface of the substrate 12 adjacent the opening 20. Such recesses and protrusions will provide a mechanical bond with the side wall members 34 after the molten second material hardens to form the movable wall 32. Alternately, holes or recesses can be formed in the substrate 12, such that the second material 68 fills the recesses. The second material 68 thereby becomes bonded to the substrate 12 when the second material 68 hardens within the recesses.

The third mold section 50 and the fourth mold section 52 are then moved away from one another and the door panel 10 is removed from the second mold assembly 44. It will be appreciated that the method of the invention can be performed with satisfactory results in a shuttle-mold wherein the second and fourth mold sections 48 and 52, respectively, move relative to a stationary first mold section 46. The method of the invention can also be performed with satisfactory results in a shuttle-mold wherein the first mold section 46 moves relative to stationary second and fourth mold sections 48 and 52, or wherein the all mold sections 46, 48, 50, and 52 move relative to one another.

A second embodiment of the method of the invention is also illustrated generally in FIGS. 6 and 7. According to the second embodiment of the method, the fourth mold section 52 preferably defines the second mold section 48. Preferably, the third mold section 50 defines the first mold section 46. The second mold section 48 includes a movable mold core, or movable portion, illustrated by a phantom line 48A. The movable portion 48A of the second mold section 48 is movable between a first position to obstruct the second cavity 66, as shown in FIG. 6, and a second position to expose the second cavity 66, as shown in FIG. 7.

The movable portion 48A of the second mold section 48 is positioned in its first position. The first material 64 is then introduced into the first cavity 62. The first material 64 then conforms to the shape of the first cavity 62, thereby forming the substrate 12, as described in detail herein. The movable portion 48A of the second mold section 48 is then positioned in its second position. The second material 68 is then introduced into the second cavity 66. The second material 68 then conforms to the shape of the second cavity 66, thereby forming the movable wall 32, as described in detail herein. Preferably, the movable wall 32 becomes chemically bonded to the substrate 12 during the molding process to form the door panel 10.

Preferably, the door panel 10 is manufactured using a two-shot molding process. The two-shot molding process may be accomplished by rotating the first mold section 46, such as in a rotational molding process. In such a rotational molding process, the substrate 12 is first injection molded in the first mold assembly 42 as described herein. The first mold section 46, containing the substrate 12 is then rotated to a second position the first mold section 46 is joined with the fourth mold section 52 to define the second mold assembly 44 and the second cavity 66. The movable wall 32 is then injection molded in the second cavity 66. Alternately, two separate molds could be used sequentially to form the substrate 12 and the flexible member 34.

It will be further appreciated that the method of forming the door panel 10 of the invention can be satisfactorily performed wherein the movable wall 32 is formed prior to the substrate 12.

A fourth step of the method of the invention includes attaching the closure 30 to the closure portion 36 of the movable wall 32. The closure 30 can be attached to the closure portion 36 of the movable wall 32 by any desired means, such as with adhesive, with mechanical fasteners, or with heat stakes such as shown at 70 in FIGS. 2 through 5, inclusive.

Figure 8:
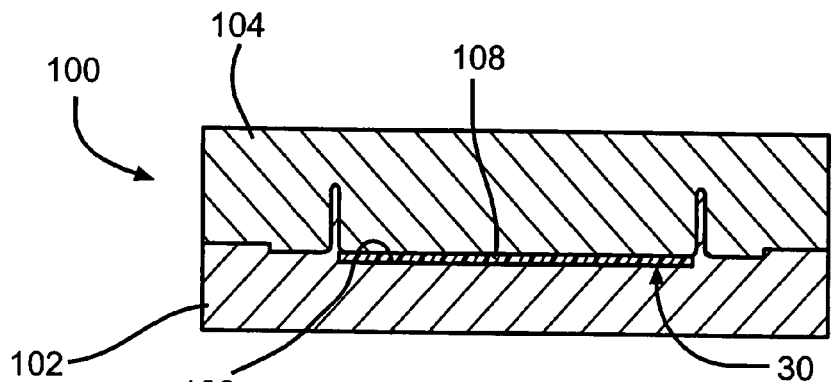
FIG. 8 is a schematic cross sectional view showing the compartment closure illustrated in FIG. 1 in a first mold assembly used in accordance with a second embodiment of the method of the invention.
Figure 9:
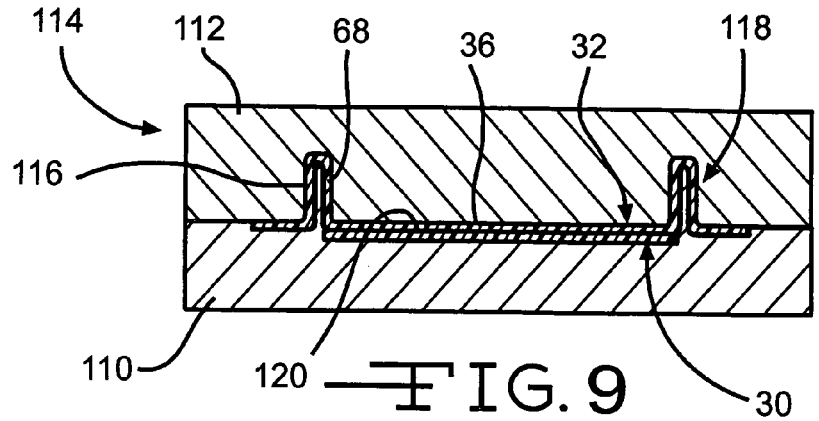
FIG. 9 is a schematic cross sectional view showing the movable wall and the compartment closure illustrated in FIGS. 2 through 4 in a second mold assembly used in accordance with the method of the invention.

A third embodiment of the method of the invention is illustrated generally in FIGS. 8 and 9. A second step of the third embodiment of the method is illustrated generally in FIG. 8. In the second step, the first mold assembly 100 is moved to a first closed position, as viewed in FIG. 8. In the first closed position, the first mold section 102 and the second mold section 104 define a first cavity 106. A first material 108 is then introduced into the first cavity 106. Preferably the first material 108 is the same as the first material 64 used to form the substrate 12, such as polypropylene or glass-filled polypropylene. It will be understood that any other desired thermoplastic can be used. The first material 108 then conforms to the shape of the first cavity 62, thereby forming the closure 30. The first mold section 102 and the second mold section 104 are then moved away from one another.

A third step of the third embodiment of the method of this invention is illustrated generally in FIG. 9. In the third step, the third mold section 110 and the fourth mold section 112 are moved into contact with one another and into a second closed position, thereby defining the second mold assembly 114 and the second cavity 116. Preferably however, the closure 30 remains in the first mold section 102 and the first mold section 102 and the fourth mold section 112 are moved into contact with one another and into the second closed position, thereby defining the second mold assembly 114. The second material 68 is then introduced into the second cavity 116, and conforms to the shape of the second cavity 116, thereby forming the movable wall 32.

Preferably, the closure portion 36 of the movable wall 32 becomes chemically bonded to the B-side surface 120 of the closure 30 during the molding process to form a closure-movable wall subassembly 118, as best shown in FIG. 9.

A fourth step of the third embodiment of the method of the invention includes attaching the movable wall members 34 of the subassembly 118 to the substrate 12. The movable wall members 34 can be attached to the B-side surface 16 of the substrate 12 by any desired means, such as with adhesive, or with mechanical fasteners.

Although not illustrated, it will be understood that a fourth embodiment of the method of the invention can include simultaneously forming the substrate 12 and the closure 30 in one mold assembly. Subsequently, the movable wall 32 can be formed in a second mold assembly such that the movable wall is bonded to the substrate 12 and the closure 30 as herein described above.

The method of forming a vehicle door panel 10 having a storage compartment 38 as described herein, and the door panel 10 formed thereby, is advantageous over prior art designs. The method of forming a vehicle door panel 10 is advantageous because the two-shot molding process eliminates the manual assembly of storage compartment component parts to a door panel required by the prior art methods. The method of the invention further improves quality, and eliminates the multiple components, such as fasteners, adhesives, and the like, of known vehicle trim panels.

Figure 10:
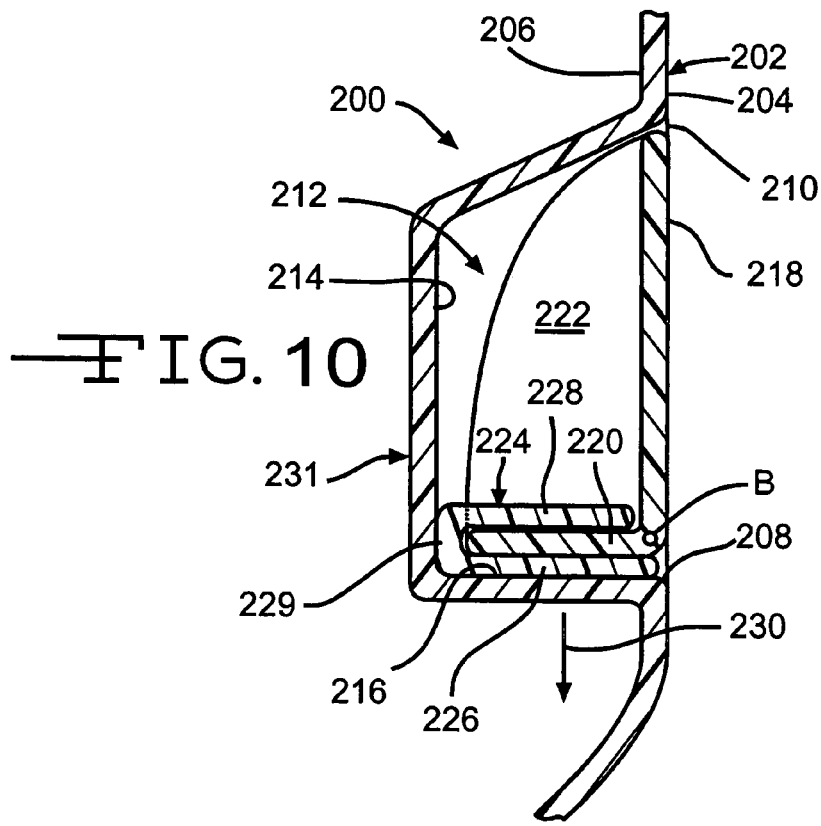
FIG. 10 is a partial cross sectional view of a vehicle trim panel manufactured in accordance with an alternate embodiment the method of the invention, showing the compartment closure in the closed position.
Figure 11:
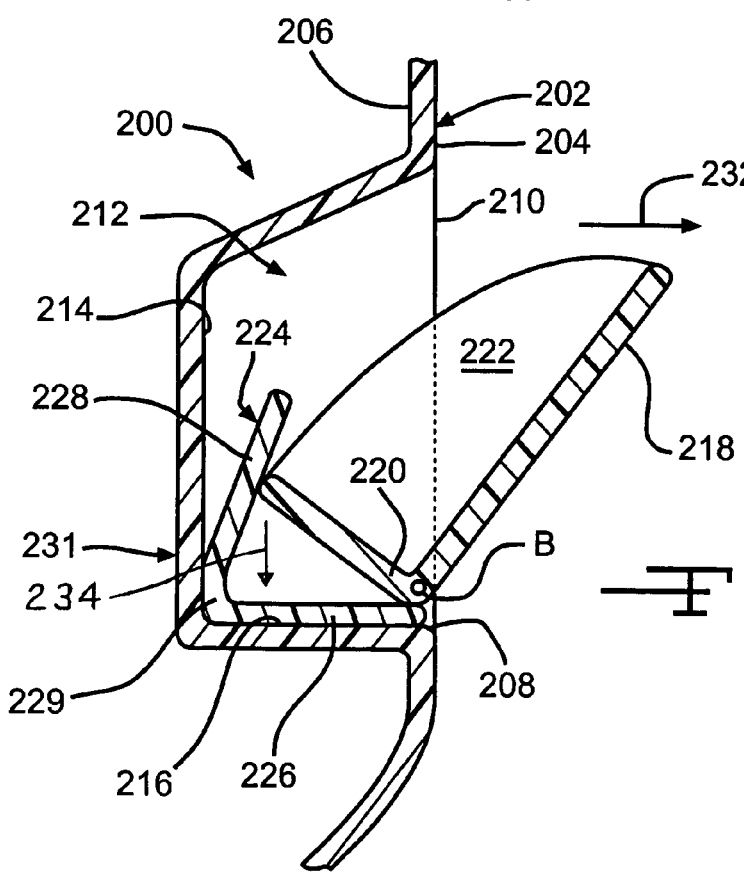
FIG. 11 is a partial cross sectional view of the vehicle trim panel illustrated in FIG. 11, showing the compartment closure in the open position.

Referring now to FIGS. 10 and 11, an alternate embodiment of the door trim panel is generally shown at 200. Preferably, the door trim panel 200 is formed according to a fourth embodiment of the method of the invention.

The door trim panel 200 includes a substrate 202. The substrate 202 includes an A-side surface 204 which faces the vehicle occupant, and a B-side surface 206 which faces away from the vehicle occupant. The substrate 202 includes an inner edge 208 which defines an opening 210. Preferably, the opening 210 defines a recess 212, and includes a rear wall 214 and a support surface 216.

Preferably, a compartment closure 218 includes a lower closure surface 220 and two inwardly extending side walls 222, only one of which is illustrated. It will be understood that such side walls 222 are not required. Preferably, the closure 218 is movably mounted to the substrate 202 and is movable between a first or closed position, as shown in FIG. 10, and a second or open position, as shown in FIG. 11. More preferably, the closure 218 is pivotally mounted to the substrate 202 about a pivot axis B.

The compartment closure 218 further includes a flexible biasing member 224. Preferably, the biasing member 224 has a substantially U-shaped cross-section defining a lower member 226, an upper member 228, and a central portion 229 therebetween. Preferably, the lower member 226 of the biasing member 224 is attached to the support surface 216 of the recess 212 and the central portion 229 is attached to the rear wall 214 according to the method of the invention, as described herein. Preferably, the lower member 226 and the central portion 229 become chemically bonded to the substrate 202 during the molding process. It will be understood that the biasing member 224 can also have any other desired shape. The rear wall 214, support surface 216, closure 218, and biasing member 224 define a storage compartment 231.

As described herein above regarding the door trim panel 10, the substrate 202 is first formed from a first material, such as polypropylene or glass-filled polypropylene, in a first mold assembly, such as illustrated in FIG. 6. The biasing member 224 is then formed from a second material, such as a flexible and resilient TPE, in a second mold assembly, such as illustrated in FIG. 7. Preferably, the door trim panel 200 is manufactured using a two-shot molding process as described in detail herein above.

As described herein, the lower member 226 of the biasing member 224 is preferably chemically bonded to the support surface 216. The support surface 216 is then inserted between the upper and lower members 228 and 226 of the biasing member 224.

In operation, the upper member 228 of the biasing member 224 exerts a force in the direction of an arrow 230 (downwardly as viewed in FIG. 10), thereby causing the closure 218 to remain in the closed position. When a vehicle occupant applies a force in the direction of the arrow 232 (substantially to the right as viewed in FIG. 11), a portion of the lower closure surface 220 engages the upper member 228 of the biasing member 224. The upper member 228 of the biasing member 224 exerts a downward force in the direction of the arrow 234, thereby causing the closure 218 to remain in the open position.

Figure 12:
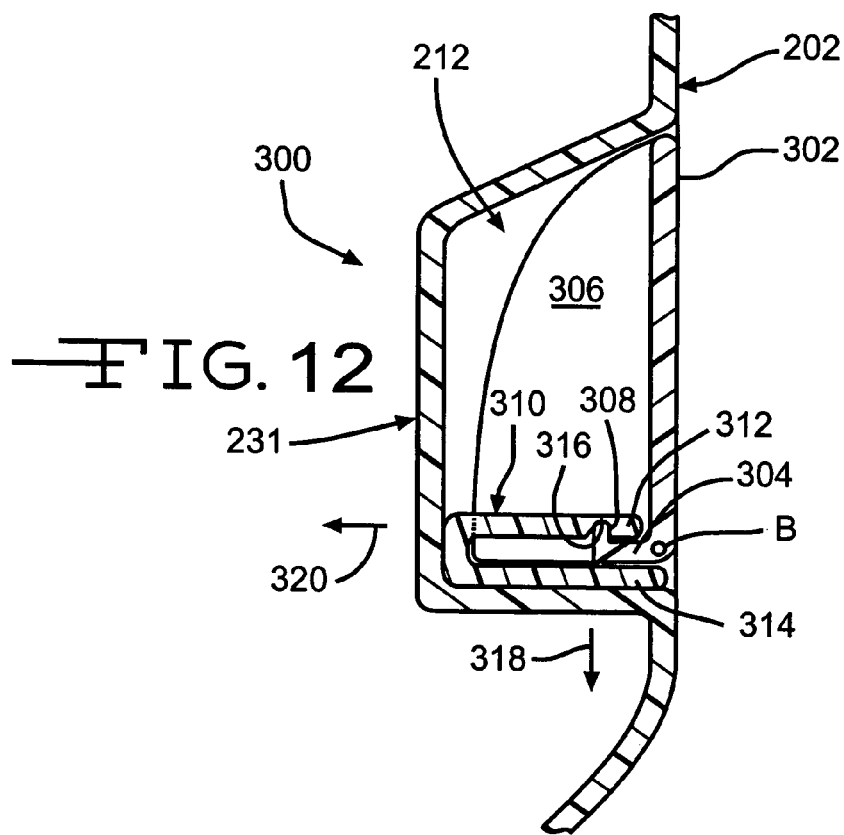
FIG. 12 is a partial cross sectional view of a vehicle trim panel manufactured in accordance with another alternate embodiment the method of the invention, showing the compartment closure in the closed position.
Figure 13:
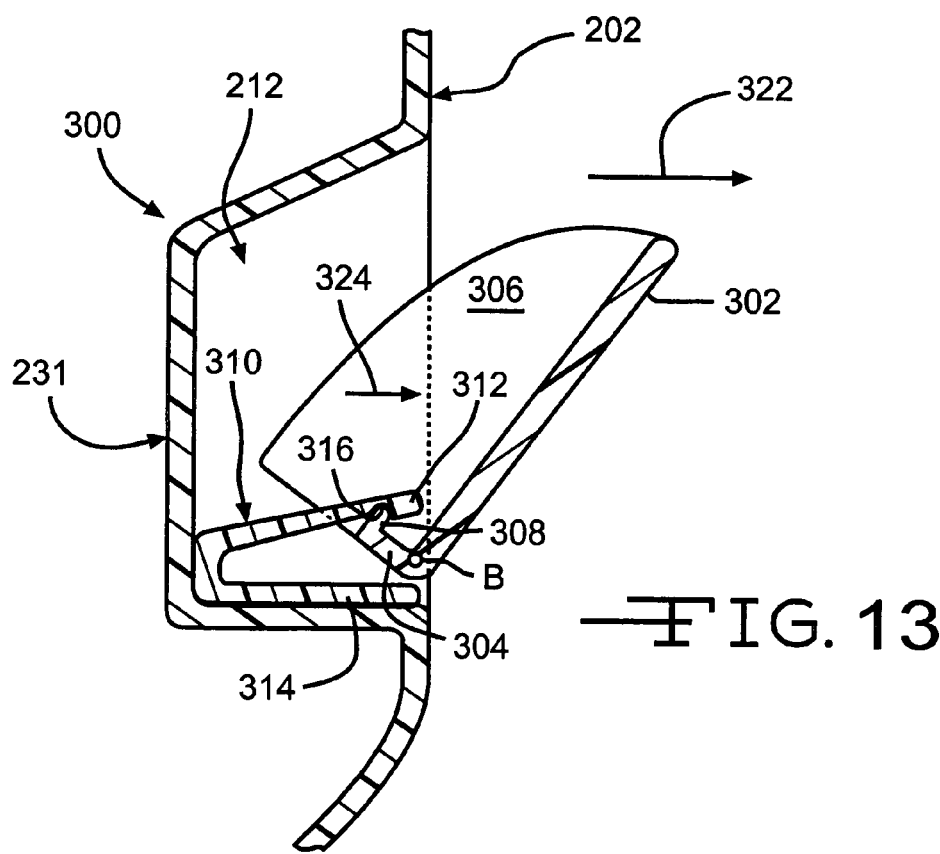
FIG. 13 is a partial cross sectional view of the vehicle trim panel illustrated in FIG. 12, showing the compartment closure in the open position.

Referring now to FIGS. 12 and 13, another alternate embodiment of the door trim panel is generally shown at 300. The door trim panel 300 is substantially identical to the door trim panel 200, and is formed according to a fifth embodiment of the method of the invention.

The door trim panel 300 includes the substrate 202 having the recess 212. The compartment closure 302 includes a lower closure surface 304 and two inwardly extending side walls 306, only one of which is illustrated. It will be understood however, that such side walls 306 are not required. The lower closure surface 304 includes an upwardly extending member 308. Preferably, the upwardly extending member 308 is an elongated member extending between the side walls 306. Preferably, the closure 302 is movably mounted to the substrate 202 and is movable between a first or closed position, as shown in FIG. 12, and a second or open position, as shown in FIG. 13. More preferably, the closure 302 is pivotally mounted to the substrate 202 about the pivot axis B.

The compartment closure 302 further includes a flexible biasing member 310. The flexible biasing member 310 includes upper and lower members 312 and 314, respectively, and is substantially identical to the flexible biasing member 224, but includes an elongated groove 316 in the downwardly facing surface of the upper member 312.

Preferably, the substrate 202 and the flexible biasing member 310 are formed as described in detail above. The support surface 304 is then inserted between the upper and lower members 312 and 314 of the biasing member 310, such that the upwardly extending member is disposed within the groove 316.

In operation, the upper member 312 of the biasing member 310 exerts a force in the direction of the arrows 318 and 320 (downward and leftward, respectively, as viewed in FIG. 12), thereby causing the closure 302 to remain in the closed position. When a vehicle occupant applies a force in the direction of the arrow 322 (to the right as viewed in FIG. 13), the upper member 312 of the biasing member 310 is caused to stretch substantially in the direction of an arrow 324 (substantially rightward as viewed in FIG. 13). When the closure 302 is released by the vehicle occupant, the upper member 312 retracts and moves to the left (as viewed in FIG. 13) to the closed position, such as shown in FIG. 12.

Although the storage compartment 38, 231 has been described herein as a vehicle map pocket, it will be appreciated that the storage compartment can be any other desired storage compartment in a vehicle, such as for example, a glove box or a center console.

The principle and mode of operation of this invention have been described in its preferred embodiments. However, it should be noted that this invention may be practiced otherwise than as specifically illustrated and described without departing from its scope.

What is claimed is:

1. A method of manufacturing a vehicle trim panel assembly having a storage compartment, the method comprising the steps of:
   a. providing a first mold assembly comprising a first mold section and a second mold section, the first mold assembly defining a first cavity;
   b. providing a second mold assembly comprising a third mold section and a fourth mold section, the second mold assembly defining a second cavity;
   c. introducing a first material into the first cavity, thereby producing a substrate; and
   d. introducing a second material into the second cavity, the second material forming a flexible biasing member;
   e. movably mounting a closure relative to the substrate, the closure including an engagement member engaged with the biasing member, such that the biasing member biases the closure in a first position while permitting movement of the closure to a second position.

2. The method according to claim 1, wherein the biasing member defines a hinge.

3. The method according to claim 1, wherein the biasing member stretches.

4. The method according to claim 1, wherein step (c) is performed subsequent to step (d).

5. The method according to claim 1, wherein the fourth mold section defines the second mold section, wherein the second mold section includes a movable portion, wherein the movable portion of the second mold section is movable between a first position to obstruct the second cavity, and a second position to expose the second cavity, wherein prior to step (c), positioning the movable portion in its first position, and wherein prior to step (d), positioning the movable portion in its second position.

6. The method according to claim 5, wherein the third mold section defines the first mold section.

7. The method according to claim 1, the first mold section defines one of the third mold section and the fourth mold section.

* * * * *